United States Patent

Spergel et al.

[15] 3,664,178
[45] May 23, 1972

[54] FLUID HANDLING APPARATUS

[72] Inventors: Philip Spergel, Lexington; Stanley L. Gaines, Wayland, both of Mass.

[73] Assignee: Instrumentation Laboratory, Inc., Lexington, Mass.

[22] Filed: Apr. 7, 1970

[21] Appl. No.: 27,199

[52] U.S. Cl. .................................73/53, 73/19, 73/61 R, 128/2 E
[51] Int. Cl. ..............................G01n 1/00, G01n 7/10
[58] Field of Search.................................73/53, 61, 19, 23, 36; 128/2 E, 2.1 E, 2.05 D

[56] References Cited

UNITED STATES PATENTS

| | | | |
|---|---|---|---|
| 2,974,519 | 3/1961 | Rhodes et al. | 73/36 |
| 3,507,146 | 4/1970 | Webb | 73/23 X |
| 3,518,982 | 7/1970 | Timmins et al. | 73/23 X |

OTHER PUBLICATIONS

Sproule, B. J., et al. An Improved Polarographic Method for Measuring Oxygen Tension in Whole Blood. In Jour. of Applied Physiology. 11(3) p. 365– 370. Nov. 1957.

*Primary Examiner*—Louis R. Prince
*Assistant Examiner*—Joseph W. Roskos
*Attorney*—Willis M. Ertman

[57] ABSTRACT

Fluid analysis apparatus includes a sample chamber that has a constituent sensor in it and an inlet conduit connected to the sample chamber. A heater assembly surrounds the inlet conduit. The heater assembly includes a preheater stage, a final heater stage, and a heat supply stage disposed between the preheater and final stages. Tempering fluid is flowed sequentially through the preheater stage, the heat supply stage and final stage and around the sample chamber for maintaining the sample chamber and the constituent sensor at a stable temperature and heating the sample to that same temperature as it flows through the inlet conduit.

20 Claims, 5 Drawing Figures

PATENTED MAY 23 1972 3,664,178

FLUID HANDLING APPARATUS

SUMMARY OF INVENTION

This invention relates to fluid analysis apparatus and more particularly to apparatus for the analysis of parameters of precious fluids such as blood.

In connection with the analysis of fluids, it is frequently desirable to provide temperature regulation. The mechanism of reaction involved in the analysis may be temperature sensitive. Also, a sudden temperature gradient may shock the sensor and delay its response of result in a less accurate response. These considerations are present in connection with the analysis of partial pressures of particular gases in blood samples. The reaction involved in a measurement of the partial pressures of carbon dioxide and oxygen is temperature sensitive and therefore it is desirable to stabilize the temperature at which the measurement is being performed. Also, blood samples to be analyzed are frequently refrigerated and exposure of the refrigerated blood sample to electrode assemblies for the measurement of partial pressures of carbon dioxide and oxygen degrades the response of the electrodes.

Accordingly, it is an object of this invention to provide novel and improved fluid handling systems for use in fluid analysis apparatus.

Another object of this invention is to provide novel and improved fluid processing apparatus that provides improved temperature control and stability.

Still another object of the invention is to provide novel and improved arrangements for tempering fluid samples to be analyzed.

Still another object of the invention is to provide novel and improved apparatus for the analysis of parameters of precious fluids such as blood.

In accordance with the invention there is provided fluid analysis apparatus which includes a sample chamber, a constituent sensor in communication with the chamber, an inlet conduit connected to the sample chamber and a heater assembly surrounding the inlet conduit. The heater assembly includes a preheater stage, a final heater stage, and a heat supply stage disposed between the preheater and final stages. Tempering fluid is flowed sequentially through the preheater stage, the heat supply stage, the final stage and around the sample chamber for maintaining the sample chamber at a stable temperature and heating the sample to be measured to that stable temperature as it flows through the inlet conduit. A temperature sensor senses the temperature of the tempering fluid in the final stage and controls the operation of the heat supply stage.

The fluids entering the sample chamber are efficiently heated to the selected measuring temperature so that a long, thermal equilization time before measurements can be taken is eliminated. Not only is the time required to obtain meaningful measurements reduced but instrument accuracy is also increased by minimizing constituent sensor temperature change, particularly in particular embodiments where a small temperature difference of either the constituent sensor or the sample in the sample chamber affects the electrical characteristics of the constituent sensor and therefore the system accuracy. In a particular embodiment, the close coupling of the heat supply stage element, the temperature sensor and the sample chamber makes possible very precise temperature control of the water bath consequently of the sample, the sample chamber and the constituent sensor. The design permits economical and efficient manufacture and servicing. Also, the sample in the sample chamber is visible and therefore it can be determined whether the sample chamber is full or if there are any trapped air bubbles in the blood sample.

In a particular embodiment, the time delay of tempering fluid flow from the heater to the temperature sensor is approximately 0.06 seconds. Sample fluid is introduced into the sample chamber at a flow rate of about 25 microliters per second and is heated to $37 \pm 0.05°$ C. from a temperature as low as $4°$ C.; flush solution flows at a rate of about 200 microliters per second and is heated to $37 \pm 0.05°$ C. from a temperature as low as $25°$ C.; and calibrating gases flowing at a rate of 0.01 cubic inch per second are similarly heated.

Other objects, features, and advantages of the invention will be seen as the following description of a particular embodiment progresses, in conjunction with the drawings, in which.

DESCRIPTION OF PARTICULAR EMBODIMENT

Figure 1:
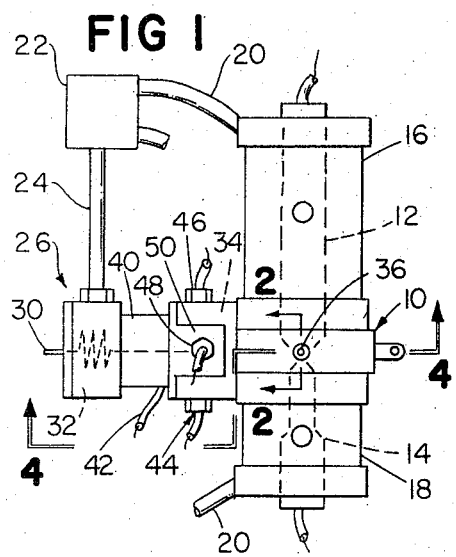
FIG. 1 is a diagrammatic view of a fluid handling system constructed in accordance with the invention.

The apparatus shown in FIG. 1 includes a housing 10 of transparent acrylic plastic (Plexiglas Clear "G") that defines a sample chamber in which the sensing ends of two electrode assemblies 12, 14 are disposed. A water jacket structure 16, 18 surrounds each electrode assembly 12, 14, respectively and has an outlet 20 that is connected to circulator pump 22. The outlet 24 from pump 22 is connected to a heater unit 26 and the reheated fluid, which in this embodiment is water, is flowed back through the heater assembly 26 to the sample chamber structure 10 and water jackets 16, 18.

The fluid to be analyzed is supplied over 0.023 inch I.D. stainless steel line 30 through a preheater stage 32 in the heater assembly 26 and a final heater stage 34 for introduction into the sample chamber and then flow out through outlet passage 36. Disposed between the preheater and final heater stages of the heater assembly is a heater unit 40 which is energized by power supplied over lines 42. A thermistor sensor 44 is provided to sense the temperature of the fluid in the final heater stage 34 and a second temperature sensor 46 is provided to sense the temperature of the structure of the final heater stage 34. A lamp 48, mounted on bracket 50, provides a source of illumination to pass light through the transparent sample chamber structure 10 so that the position of a sample in that chamber may be easily viewed.

Figure 2:
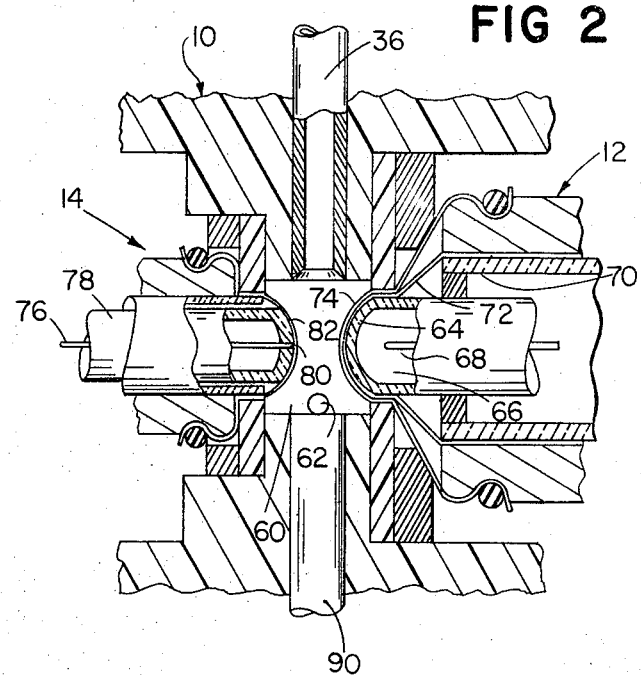
FIG. 2 is a sectional view on a larger scale of the sample chamber and constituent sensors employed in the embodiment shown in FIG. 1.

Details of the sample chamber and sensors may be seen with reference to FIG. 2. The sample chamber 60, 0.125 inch in width and 0.20 inch in diameter is a cylindrical chamber formed in the clear plexiglass block 10. Entrance port 62 has a diameter of 0.037 inch. Outlet passage 36 is of larger diameter. Electrode assembly 16 is a $pCO_2$ sensor which includes a pH sensitive glass membrane 64 at its tip which forms the end wall of an inner chamber 66 in which is housed a silver/silver chloride electrode 68. Outer chamber 70 is filled with a $pCO_2$ electrolyte and contains a silver/silver chloride reference electrode. Disposed over the end of the electrode assembly is a nylon spacer membrane 72 and a silastic membrane 74 that is permeable to carbon dioxide gas but not to ions. The electrode assembly 18 is a $pO_2$ sensor which includes a cathode wire 76 sealed in glass envelope 78 so that only its tip 80 is exposed at the end of envelope 78. This reactive surface 80 is covered by a polypropelene membrane 82 which is permeable to oxygen but not to contaminants and reducible ions of the sample. To provide electronics for the cathode reaction, a silver/silver chloride anode is incorporated in the electrode assembly 18.

Figure 3:
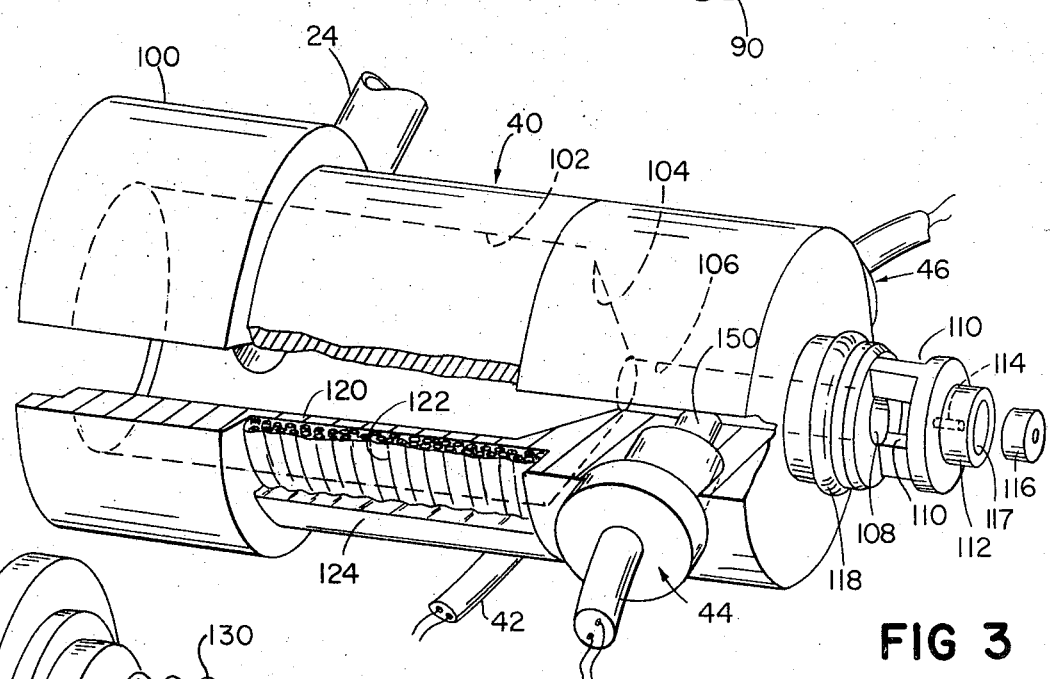
FIG. 3 is an exploded perspective view of components of the heater assembly employed in the system shown in FIG. 1.
Figure 3:
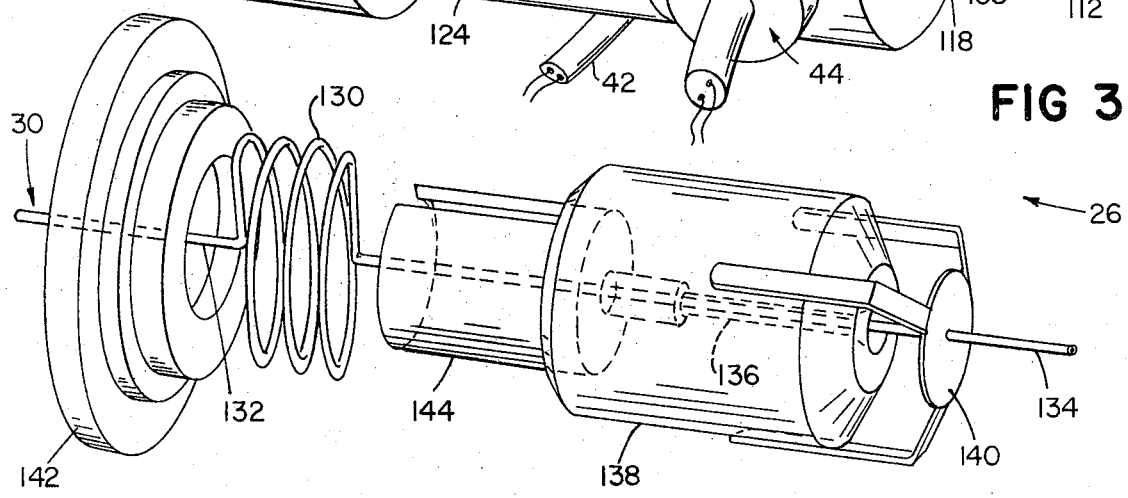

With reference to FIG. 3, the heater assembly 26 includes an anodized aluminum housing 100 that has a cavity formed by inner cylindrical wall 102 which defines the preheater and heater sections, and a transition wall 104 which connects wall 102 to aluminum section 106 of the final heater stage 34. That conduit section extends to an outlet port 108 which communicates with lateral openings 110 that permit heated fluid to be discharged laterally in either direction as indicated by the arrows in FIG. 4, Beyond openings 110 is a sleeve section 112 having a bore 114. Seal 116 is received in recess 117 at the end of member 100 and O-ring seal 118 is disposed on the structure defining the outlet of conduit 106. The wall 120 of housing 100 between the preheater and final heater stages has a thickness of 0.010 inch and a heater coil 122 is disposed over that section and secured in place member 124.

Inlet tube 30 has an intermediate section formed in a four turn coil 130 between straight inlet section 132 and straight outlet section 134. The outlet section 134 passes through a bore 136 in block 138 and supporting spider 140. The inlet section 132 passes through and is sealed in cap 142. Cylindrical spacer 144, disposed between block 138 and cap 142, is surrounded by coil 130.

Figure 4:
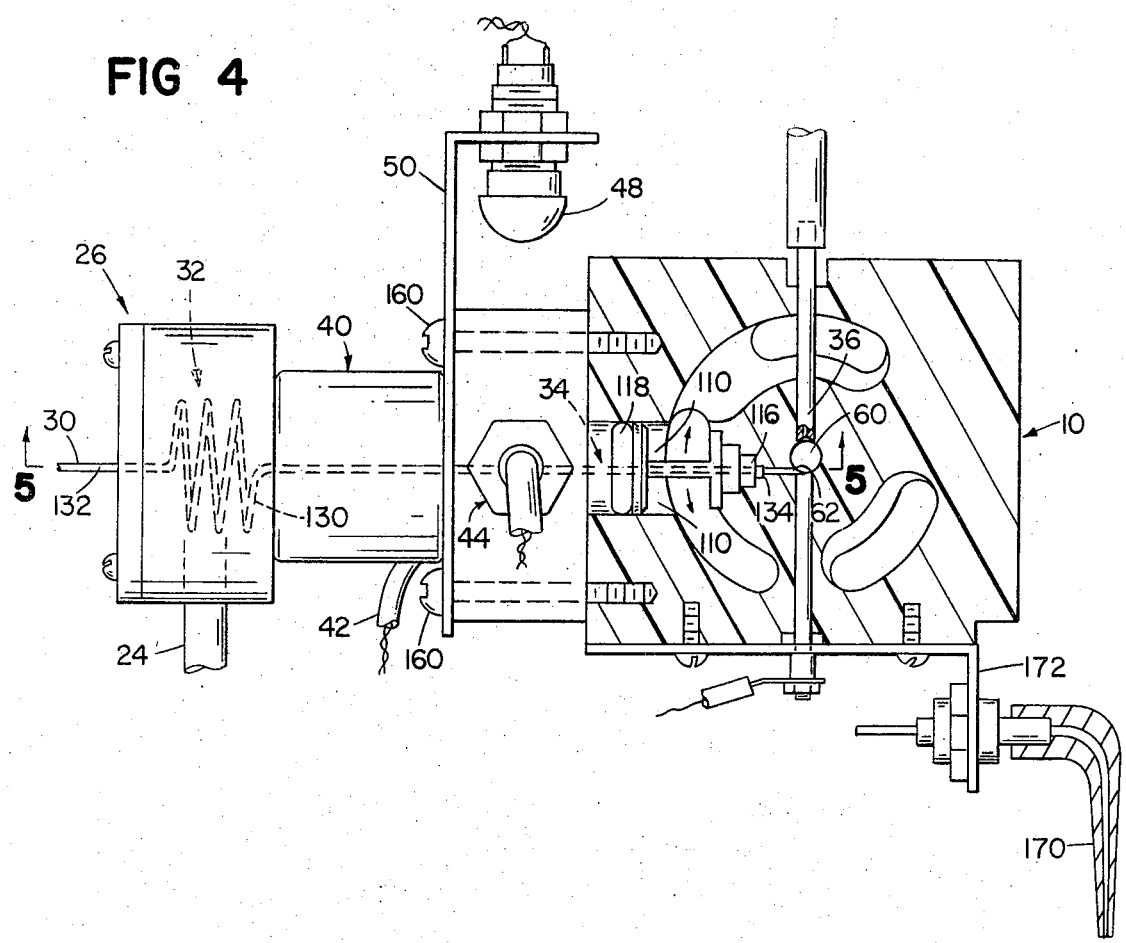
FIG. 4 is a view taken along the line 4—4 of FIG. 1 showing details of the sample chamber, heater assembly, and other components of the system shown in FIG. 1.
Figure 5:
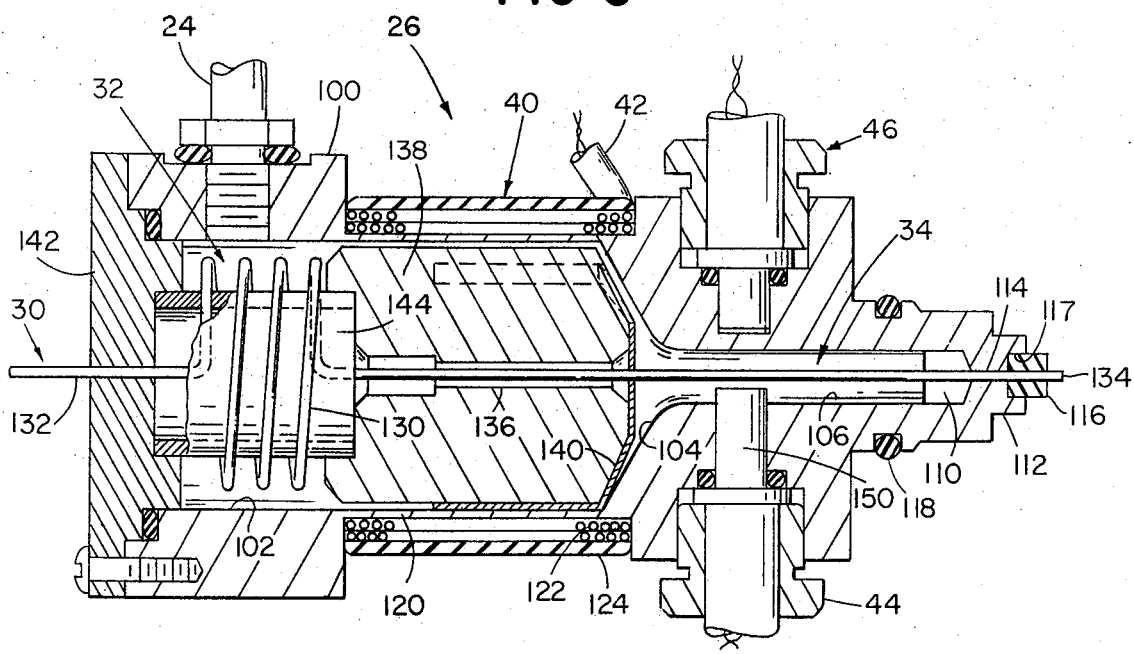
FIG. 5 is a sectional view of the heater assembly taken along the line 5—5 of FIG. 4.

The heater assembly is shown in section in FIG. 5. As assembled, the inlet end of the tube 130 extends through end cap 142; coil 130 is disposed over spacer 144; block 138 is supported by spider 140 in juxtaposition to the heater coil 122; and the outlet portion of 134 of tube 30 extends through the block 138, conduit section 106 and support bore 114 and receives on its end the sealing washer 116. Block 138 has a diameter of seven-eights inch and the dimension of the annular passageway between block 138 and wall 102 is about 0.010 inch. Transition surface 104 and the end surface of block 138 are dimensioned to provide a transition passageway of uniform cross-sectional area to the final heater passage 106. In operation, water is pumped through conduit 24 into the preheater chamber 32 for flow over coil 130 and then is forced through the annular passage between surface 102 and block 138 at higher velocity for exposure in a thin annular sheath to the heater 122 and then down to the final heater section for passage directly over the outlet portion 134 of tube 30 at substantially the same velocity as past the heater section. The water is then discharged laterally through the ports 110 as indicated by the arrows in FIG. 4 for flow through the sample chamber structure 10 and then outwardly through the water jackets 16 and 18 respectively, conduits 20 and pump 22 for recirculation. The temperature sensor 44 is mounted in housing 150 which has an end surface of 0.010 inch thickness thus minimizing thermal lag, and its output controls heater 42. A second temperature sensor 46 senses the temperature of the heater structure and its output signal indicative of a temperature rise to 40°–43° C. opens the heater winding 122.

The assembly of the heater assembly and the sample chamber, electrode, water jacket assembly is shown in FIG. 4. As there indicated, the nose portion of the heater assembly 28 is inserted into the block 10 with the end of section 134 of tube 30 aligned with inlet passage 62. Bolts 160 secure the heater assembly to the sample chamber structure and compress seals 116, 118 prevent leakage of either sample or heated fluid while permitting direct flow of the temperating fluid into the sample chamber structure and through that structure for flow through the electrode water assembly jackets 16 and 18. Bolts 160 also secure the bracket 50 on which is mounted lamp 48 which provides illumination to facilitate the viewing of fluid in sample chamber 60.

The fluid to be analyzed, in this embodiment samples of blood, is introduced through sampling tip 170 supported on bracket 172 from the member 10 and the sample is applied to tube 30 by a selector valve (not shown) which also channels calibrating fluid and cleaning fluid to tube 30 under the influence of reduced pressure applied to the output line 36 by a pump system (not shown). In a blood sample analysis mode, the sample tip 170 is emersed in a blood sample to be analyzed and outlet line 36 is connected to a pump which draws the sample at a rate of about 25 microliters per second. The sample flows through tube 30 through coil 130 in the preheater section where the sample is brought to nearly the selected temperature in this embodiment 37±0.05° C. The preheater chamber has a much larger volume than coil 130 so that the water temperature is not significantly decreased by the heat transfer. The sample then flows through block 138 while the tempering fluid flows in a sheath past the heater 122 to receive that amount of energy to restore its temperature. The water flow continues smoothly past the transition portion 134 into the final heater section 34 for final adjustment of the temperature of the sample and sensing by sensor 44 for control of the heater 122 and then into the structure 10 which houses the chamber 60. The sample chamber 60 and electrodes 14, 16 thus are also maintained at a preset temperature by direct flow exposure to the conditioned water and the sample is introduced into chamber 60 at that temperature. There is no thermal shock to the electrodes of the measuring system as the sample is efficiently heater in a manner that requires only a small quantity of sample. The large mass of the sample chamber and electrode assemblies is maintained at a stable temperature. This apparatus provides excellent temperature stability for accurate measurements of $O_2$ and $CO_2$ content in blood.

Cleaning solution is introduced through tube 30 at a higher velocity (a pumping rate of about 200 microliters per second) than the sample introduction rate (about 25 microliters per second) and the tangential entrance provides swirling turbulance in the sample chamber 60 that facilitates cleaning for the next sample analysis sequence. Additional details of a blood analysis system in which this apparatus is incorporated are set out in copending patent application, Ser. No. 27,200, entitled "Fluid Analyzing Apparatus" filed in the names of Spergel et al., and assigned to the same assignee as this application.

While a particular embodiment of the invention has been shown and described, various modifications thereof will be apparent to those skilled in the art and therefore it is not intended that the invention be limited to the disclosed embodiments or to details thereof and departures may be made therefrom within the spirit and scope of the invention as defined in the claims.

What is claimed is:

1. Fluid analysis apparatus comprising a sample chamber, a constituent sensor in communication with said sample chamber, an inlet conduit connected to said sample chamber, and a heater assembly surrounding said inlet conduit, said heater assembly including a preheater stage, a final heater stage, a heat supply stage disposed between said preheater and final stages, and a housing having a first cavity section at said preheater and heat supply stages, a second cavity section of smaller cross-sectional dimensions than said first cavity section at said final heater stage, a transition wall section between said first and second cavity sections, and an insert member disposed in said first cavity section, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit, said insert member defining, with the inner surface of said first cavity section, a chamber through which said tempering fluid flows past said heat supply stage, said transition wall section cooperating with said insert member to define a transition passageway between said first and second cavity sections so dimensioned that said tempering fluid flows through said transition passageway and said second cavity section at substantially the same velocity as through said heat supply stage.

2. The apparatus as claimed in claim 1 wherein a first portion of said inlet conduit is disposed in coil form in said preheater stage and a second portion of said inlet conduit is in straight form and is located coaxially within said heat supply and final heater stages.

3. The apparatus as claimed in claim 1 and further including a temperature sensor for sensing the temperature in said final stage to control the operation of said heat supply stage.

4. The apparatus as claimed in claim 3 wherein said temperature sensor includes a thermistor disposed for sensing the temperature of said tempering fluid flowing through said final stage.

5. The apparatus as claimed in claim 1 wherein said heater assembly includes flow passages and further including chamber structures surrounding said sample chamber and said constituent sensor in communication with said heater assembly flow passages and a pump for circulating said tempering fluid in a closed circuit through said heater assembly flow passages and said chamber structures.

6. The apparatus as claimed in claim 5 wherein said sensor includes an electrode assembly responsive to a particular gas in the sample and a selectively permeable membrane across which the particular gas of interest can diffuse for sensing by the electrode assembly.

7. The apparatus as claimed in claim 6 wherein said sample chamber is cylindrical in configuration and said inlet conduit is disposed in tangential relation to the cylindrical wall of said sample chamber.

8. The apparatus as claimed in claim 7 wherein said sample chamber is formed in a structure of light transmitting material and further including a light source disposed to illuminate said structure so that the position of fluid in said sample chamber is observable.

9. The apparatus as claimed in claim 1 wherein said heater assembly includes a first port downstream from said heat supply stage for providing a flow path for said tempering fluid from said heater assembly, said sample chamber defining structure includes a second port in alignment with said first port for receiving said tempering fluid from said heater assembly, first seal means disposed between the end of said final stage and said sample chamber and second seal means disposed between said final stage and said chamber structure, said first port being located in said final stage between said first and second seal means.

10. The apparatus as claimed in claim 1 wherein a first portion of said inlet conduit is disposed in coil form in said preheater stage and a second portion of said inlet conduit is in straight form and is located coaxially within said heat supply and final heater stages and the volume capacity of said preheater stage is much greater than the volume capacity of said first portion of said inlet conduit in said preheater stage.

11. Fluid analysis apparatus comprising a sample chamber that is cylindrical in configuration, a constituent sensor in communication with said sample chamber, an inlet conduit connected in tangential relation to the cylindrical wall of said sample chamber, and a heater assembly surrounding said inlet conduit, said heater assembly including a preheater stage, a final heater stage, and a heat supply stage disposed between said preheater and final stages, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit.

12. Fluid analysis apparatus comprising a sample chamber formed in a structure of light transmitting material, a light source disposed to illuminate said structure so that the position of fluid in said sample chamber is observable, a constituent sensor in communication with said sample chamber, an inlet conduit connected to said sample chamber, and a heater assembly surrounding said inlet conduit, said heater assembly including a preheater stage, a final heater stage, and a heat supply stage disposed between said preheater and final stages, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit.

13. Fluid analysis apparatus comprising a sample chamber, a constituent sensor in communication with said sample chamber, an inlet conduit connected to said sample chamber, and a heater assembly surrounding said inlet conduit, said heater assembly including a preheater stage, a final heater stage, and a heat supply stage disposed between said preheater and final stages, a housing having a first cavity section which defines said preheater and heat supply stages and a second cavity section of smaller cross-sectional dimensions than said first cavity section which defines said final heater stage, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit.

14. The apparatus as claimed in claim 13 and further including an insert member disposed in said first cavity section and defining, with the inner surface of said first cavity section, an annular chamber through which said tempering fluid flows past said heater supply stage.

15. The apparatus as claimed in claim 14 wherein said housing further includes a transition wall section between said first and second cavity sections, said transition wall section cooperating with said insert member to define a transition passageway between said first and second cavity sections to dimensionsed that said tempering fluid flows through said transition passageway and said second cavity section at substantially the same velocity as through said heat supply stage.

16. Fluid analysis apparatus comprising a sample chamber, a constituent sensor in communication with said sample chamber, an inlet conduit connected to said sample chamber, and a heater assembly surrounding said inlet conduit, said heater assembly including a preheater stage, a final heater stage, and a heat supply stage disposed between said preheater and final stages, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit, said heater assembly further including a first port downstream from said heat supply stage for providing a flow path for said tempering fluid from said heater assembly and a second port in the sample chamber defining structure aligned with said first port for receiving said tempering fluid from said heater assembly.

17. Fluid analysis apparatus comprising a sample chamber, a constituent sensor in communication with said sample chamber, an inlet conduit connected to said sample chamber, and a heater assembly surrounding said inlet conduit, said heater assembly including a preheater stage, a final heater stage, and a heater supply stage disposed between said preheater and final stages, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit, first seal means disposed between the end of said final stage and said sample chamber and second seal means disposed between said final stage and said chamber structure, and a discharge port for said tempering fluid is located in said final stage between said first and second seal means.

18. Fluid analysis apparatus comprising a sample chamber, a constituent sensor in communication with said sample chamber, an inlet conduit connected to said sample chamber, and a heater assembly surrounding said inlet conduit, said heater assembly including a preheater stage having a volume capacity much greater than the volume capacity of that portion of said inlet conduit in said preheater stage, a final heater stage, and a heat supply stage disposed between said preheater and final stages, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit.

19. Fluid analysis apparatus comprising a sample chamber, a constituent sensor in communication with said sample chamber, an inlet conduit connected to said sample chamber, and a heater assembly surrounding said inlet conduit, said heater assembly including a preheater stage, a final heater stage, and a heat supply stage disposed between said preheater and final stages, means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit, a thermistor disposed for sensing the temperature of said tempering fluid flowing through said final stage to control the operation of said heat supply stage and a second temperature sensor disposed in juxtaposition to said thermistor for sensing the temperature of said heater assembly.

20. Fluid analysis apparatus comprising a sample chamber, a constituent sensor in communication with said sample chamber, an inlet conduit connected to said sample chamber, and a heater assembly surrounding said inlet conduit, said heater assembly including a preheater stage, a final heater stage, and a heat supply stage disposed between said preheater and final stages, said heat supply stage including a thin annular wall element, an insert member disposed within said annular wall element so that an annular chamber is defined therebetween, the width of said wall element and the width of said annular chamber being substantially the same, and means to flow a tempering fluid sequentially through said preheater stage, said heat supply stage, said final stage and around said sample chamber for maintaining said sample chamber and said constituent sensor at a stable temperature and heating the sample to be measured to said stable temperature as it flows through said inlet conduit, electric heater means disposed over said wall element for supplying heat to tempering fluid flowing through said annular chamber to control the operation of said heat supply stage, and circuitry connecting said temperature sensor to said electric heater means.

* * * * *